United States Patent
Yamazaki et al.

(10) Patent No.: US 6,598,053 B1
(45) Date of Patent: Jul. 22, 2003

(54) DRAWING GENERATION APPARATUS

(75) Inventors: Hiroshi Yamazaki, Kanagawa (JP); Saori Izumi, Kanagawa (JP); Ritsuko Fukumuro, Kanagawa (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/481,498

(22) Filed: Jan. 12, 2000

(30) Foreign Application Priority Data

Jan. 14, 1999 (JP) .............................. 11-008444

(51) Int. Cl.[7] .............................................. G06F 17/30
(52) U.S. Cl. .................... 707/102; 345/442; 345/443; 345/441; 707/1; 707/3
(58) Field of Search ................................. 345/672, 676, 345/677, 680, 678, 441–443; 707/1, 3, 102, 502

(56) References Cited

U.S. PATENT DOCUMENTS

| | | | | |
|---|---|---|---|---|
| 5,437,008 A | * | 7/1995 | Gay et al. | 345/676 |
| 5,835,078 A | * | 11/1998 | Arita et al. | 345/676 |
| 5,883,636 A | * | 3/1999 | Hayashi et al. | 345/677 |
| 6,154,875 A | * | 11/2000 | Tanaka et al. | 717/2 |

* cited by examiner

Primary Examiner—Jean M. Corrielus
Assistant Examiner—Cam Y T Truong
(74) Attorney, Agent, or Firm—Rothwell, Figg, Ernst & Manbeck

(57) ABSTRACT

A drawing generation apparatus includes: positioning markers provided in each source component drawing and destination component drawing involved and displayed to indicate a source. reference position and a destination reference position, respectively; a component drawing database for storing the component drawings; a component information database that allows selection of the component drawings based on one of the input specification information and the drawing information, and outputting component drawing information relating to the component drawings; and an engine unit for retrieving the component drawings from said component drawing database based on the component drawing information from said component information database, and combining the component drawings such that the positioning markers are aligned.

2 Claims, 5 Drawing Sheets

DRAWING GENERATION APPARATUS

BACKGROUND OF THE INVENTION

1. Field of the Invention

The present invention generally relates to drawing generation apparatuses and, more particularly, to a drawing generation apparatus for generating an assembly drawing, a specification drawing and the like for a product.

2. Description of the Related Art

A drawing generation apparatus known in the art may comprise a storage device for storing CAD drawing data of various versions together with associated search keys, a search device for receiving an input of a search key related to a desired specification and retrieving a related drawing from the storage device, a display device for displaying the drawing data retrieved from the storage apparatus and a printing device for printing the drawing that matches the selected specification.

While the apparatus described above allows selection of drawings that match respective desired specifications by storing a large number of drawings, the storage device that meets this requirement should have an extremely large capacity. Another requirement is that the search device should perform a search efficiently.

In one approach toward improvement of the related-art drawing apparatus, drawing data for individual components of a product are stored in the storage device so that drawings that match similar specifications are created by combining component drawing data. In this approach, it is intended that the capacity requirement for the storage device be controlled.

In the apparatus as described above, a drawing matching a specification is created by inputting a desired specification, retrieving associated component drawing data from the storage device, manually combining the component drawing data and entering dimension lines.

Since the drawing data that meet various specifications should be stored in the drawing generation apparatus described above, the storage device is required to have a large storage capacity. Also, the level of performance is so high that the apparatus is not cost effective.

Another aspect of the related-art drawing generation apparatus designed to reduce the storage capacity of the storage device by storing component drawing data is that combining of component drawing data may require an extensive manual operation.

The disadvantage of the related-art drawing generation apparatus in actual applications will be described in detail. For example, the requirement for configuration of a control valve used in an air-conditioning facility or a work measurement and control system that meets the needs of customers is so varied that as many as hundreds of thousands to several millions of configurations should be available. The storage device storing the entirety of the drawing data needs to have an extremely large capacity. Combining of the drawing data involves complicated operations, causing a displacement from proper positions and requiring an enormous amount of time to draw dimension lines with respect to the combined component drawing.

SUMMARY OF THE INVENTION

Accordingly, a general object of the present invention is to provide drawing generation. apparatuses in which the aforementioned problems are eliminated.

Another and more specific object is to provide a drawing generation apparatus in which component drawings are stored in the form of a database to prevent the required capacity of a storage device from being increased, in which combining of component drawing data is performed easily-and efficiently, and in which dimension lines are easily provided.

Still another object is to provide a drawing generation apparatus in which as many as several tens to several millions of drawings are managed as logical entity instead of physical entity so that the drawings are efficiently managed.

The aforementioned objects can be achieved by a drawing generation apparatus for generating a drawing that matches a specification by selecting component drawings based on one of input specification information and drawing information, and combining the component drawings by pasting a source component drawing to a destination component drawing, comprising: positioning markers provided in each source component drawing and destination component drawing involved and displayed to indicate a source reference position and a destination reference position, respectively; a component drawing database for storing the component drawings; a component information database that allows selection of the component drawings based on one of the input specification information and the drawing information, and outputting component drawing information relating to the component drawings; and an engine unit for retrieving the component drawings from said component drawing database based on the component drawing information from said component information database, and combining the component drawings such that the positioning markers are aligned.

By dividing a drawing into component drawings, the capacity of a database is decreased. Combining of the component drawings can be performed accurately and efficiently using the positioning markers. Therefore, the amount of work involved is significantly reduced. Since the drawings are managed as logical entity instead of physical entity, management of the drawings is simplified and improved in efficiency.

A dimension line for each of the component drawings may be provided with a dimension line positioning marker corresponding to one of the source reference position and the destination reference position, and the component drawings may be combined such that the dimension line positioning markers are aligned, causing the dimension line to be one of extended and compressed.

With this, the dimension lines can be automatically connected across a plurality of combined component drawings so that the labor of redrawing the dimension lines is eliminated.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENT

Figure 1:
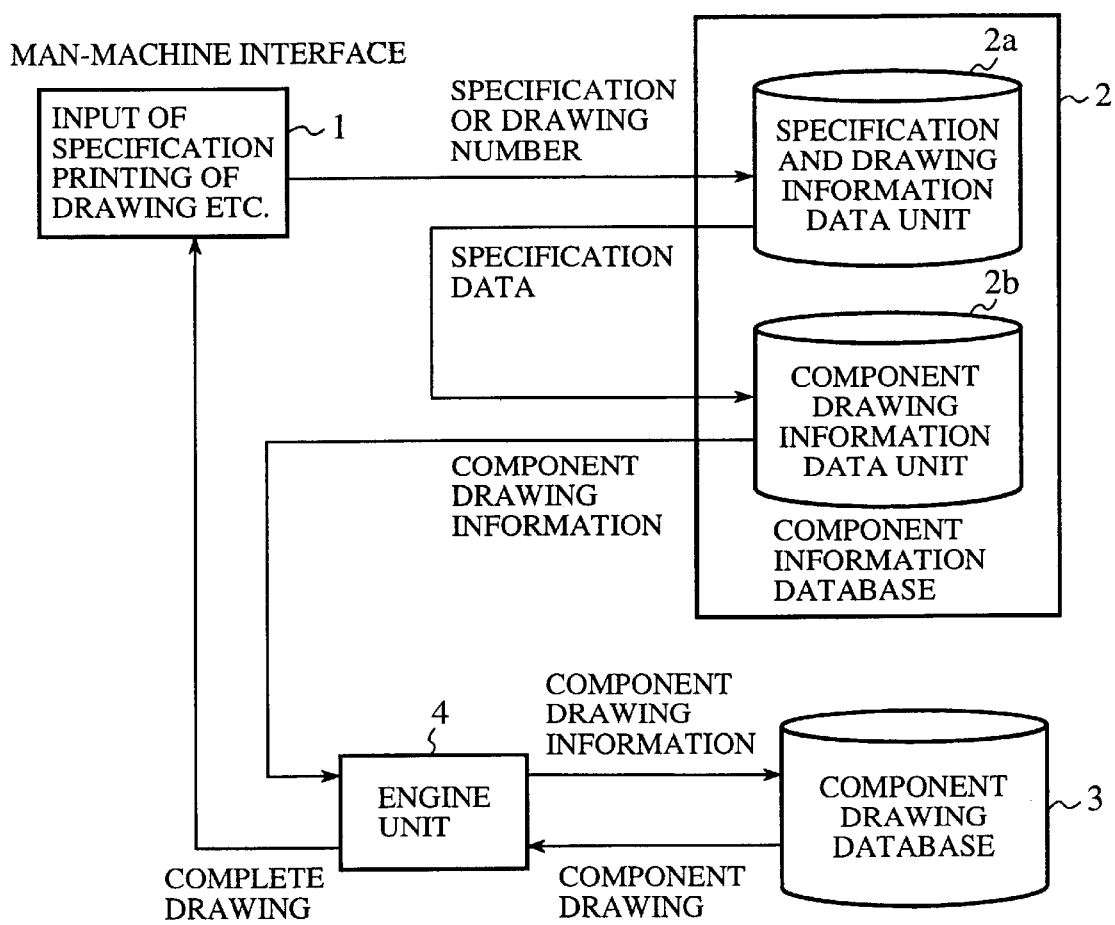
FIG. 1 is a block diagram showing the construction of a drawing generation apparatus according to the present invention.

FIG. 1 is a block diagram of the drawing generation apparatus according to the present invention. The drawing generation apparatus comprises a man-machine interface 1 constructed of an input device for inputting a desired product specification, a display device for displaying an image, and a printing device for printing a complete drawing; and a component information database 2 constructed of a specification and drawing information data unit 2a and a component drawing information database 2b. The specification and drawing information data unit 2a stores specification data such as product IDs, sizes and connection configurations input to the man-machine interface 1. The component drawing information 2b stores component drawing information serving as a search key for searching the component drawing specified by the specification data stored in the specification and drawing information data unit 2a. Also provided in the drawing generation apparatus is a component drawing database 3 storing component drawings retrieved based on the component drawing information from the component information database 2, and an engine unit 4 for combining the selected component drawings.

A description will now be given of the operation.

Figure 2:
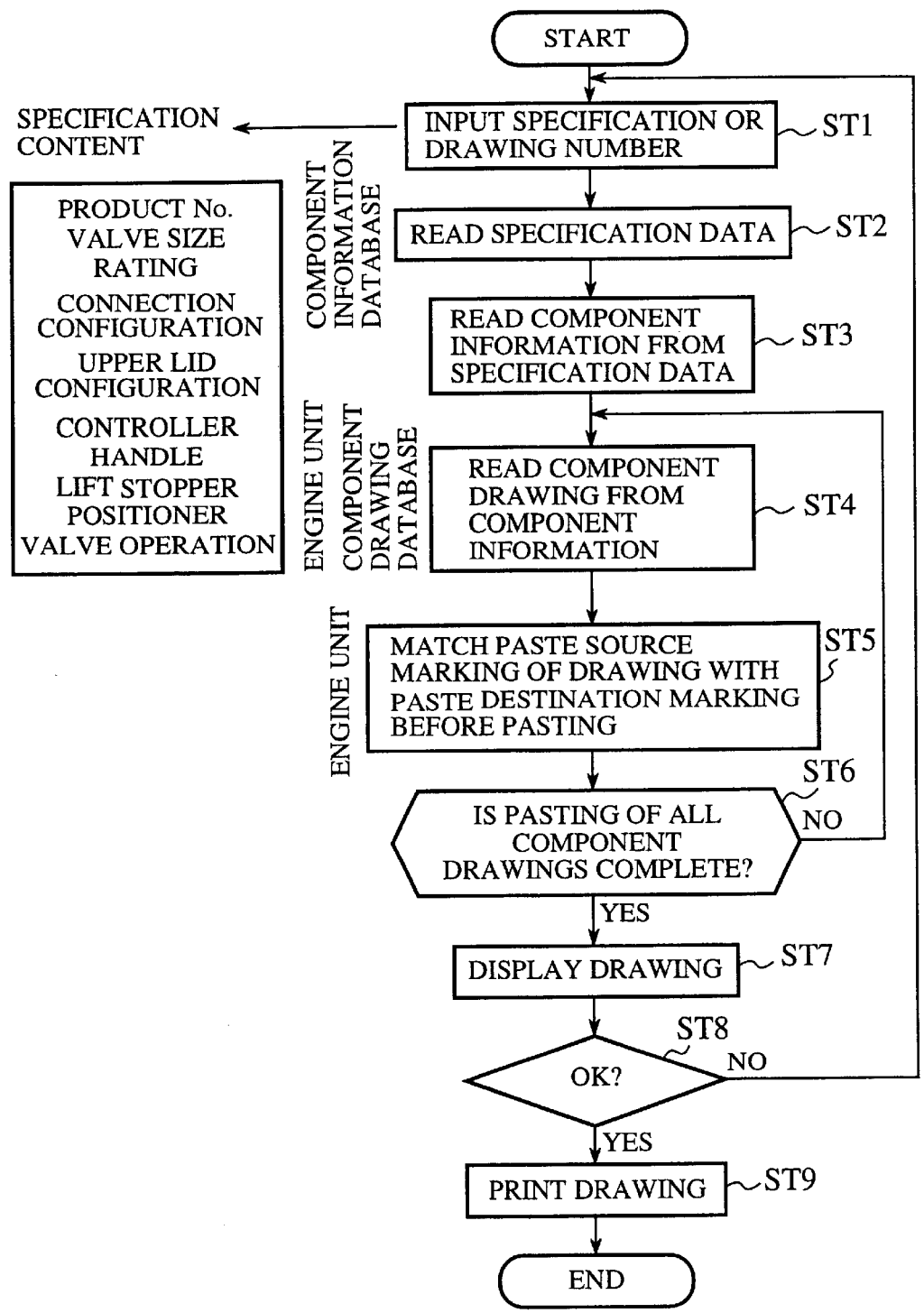
FIG. 2 is a flowchart showing the operation of a drawing generation apparatus according to the invention.
Figure 3:
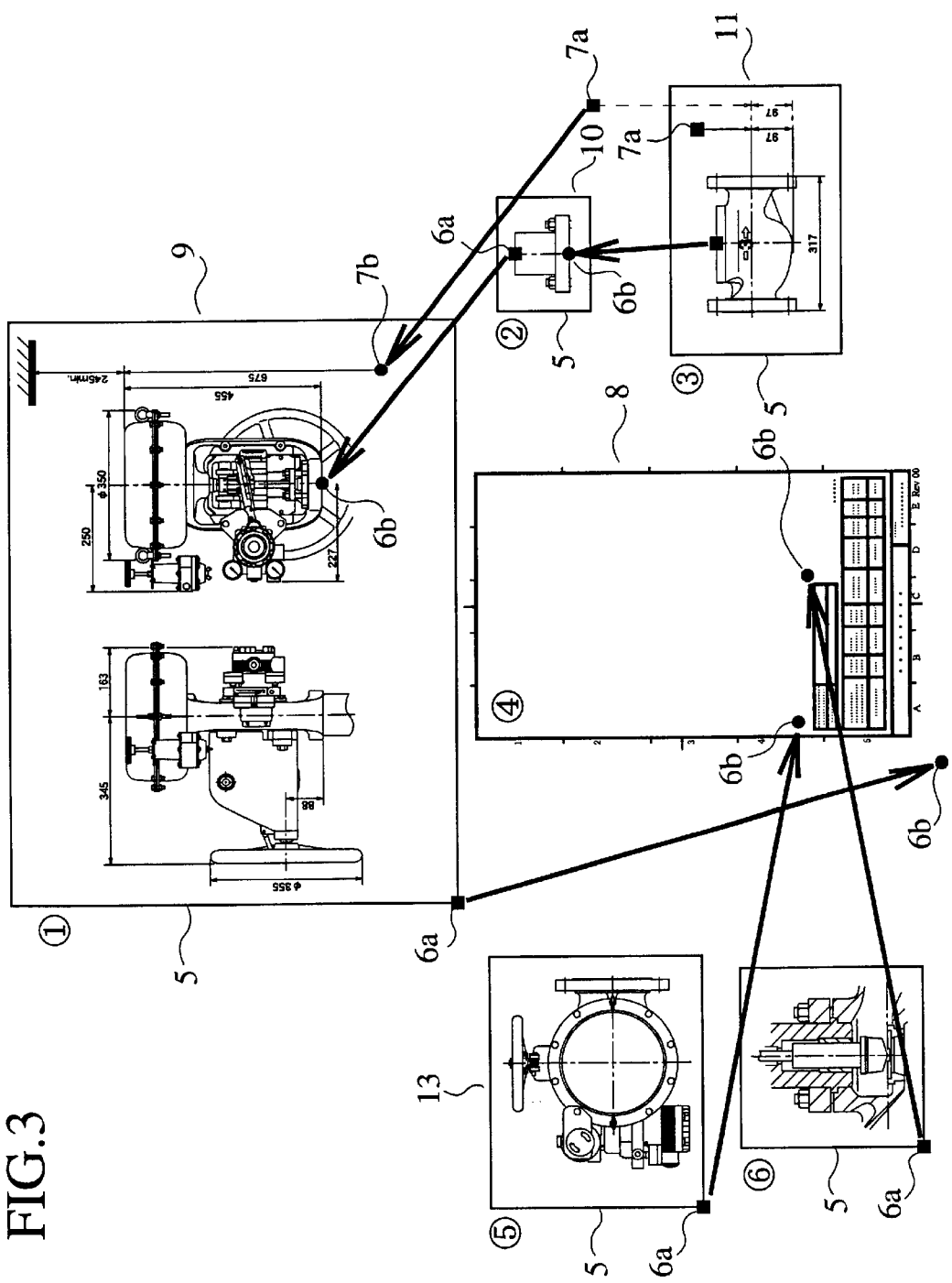
FIG. 3 is a diagram illustrating a process of combining component drawings in the drawing generation apparatus according to the invention.
Figure 4:
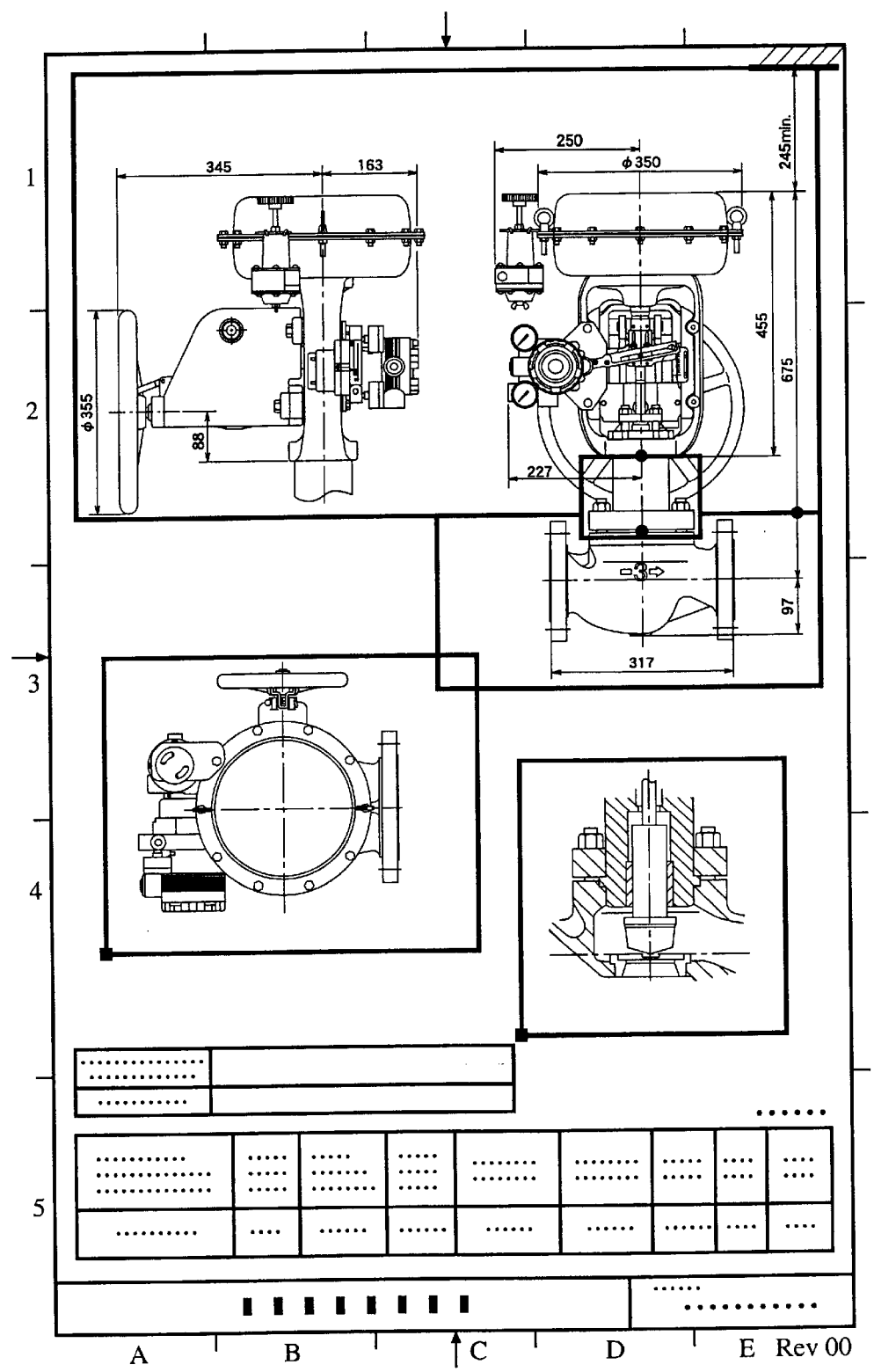
FIG. 4 is a diagram showing a state in which the combining process is completed.
Figure 5:
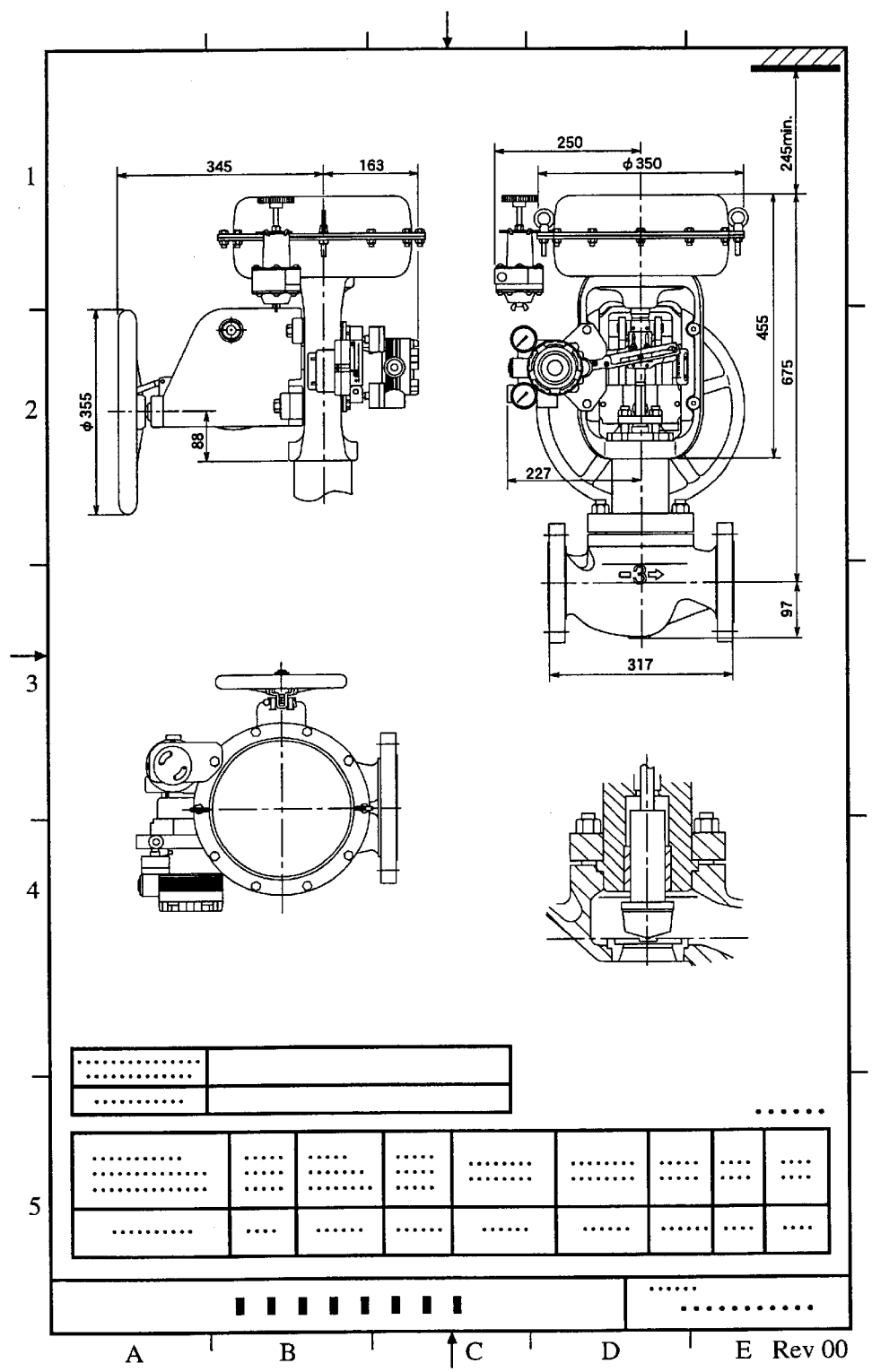
FIG. 5 is a diagram showing a complete drawing generated by the drawing generation apparatus according to the invention.

FIG. 2 is a flowchart showing the operation of the drawing generation apparatus according to the invention. FIGS. 3–5 show respective steps of a process for generating a drawing. More specifically, FIG. 3 shows a state in which component drawings to be combined are selected; FIG. 4 shows a state in which the component drawings are combined; and FIG. 5 shows a complete drawing.

When a specification specifying an ID number, size and connection configuration of a desired product is input to the man-machine interface 1 (step ST1), the specification data is read out from the specification and drawing information data unit 2a of the component information database 2 (step ST2). The corresponding component drawing information is read out from the component drawing information data unit 2b based on the specification data and output to the engine unit 4 (step ST3).

The engine unit 4 reads out the component drawing from the component drawing database 3 based on the component drawing information supplied from the component information database 2 (step ST4). The component drawing is provided with a virtual framework to which is attached a positioning marker serving as a reference point for determining the position of a source drawing with respect to a destination. FIG. 3 shows a sequence of combining and relationships between pairs of positioning markers. FIG. 3 is a drawing of a control valve for industrial process control.

Referring to FIG. 3, reference numeral 5 indicates a virtual framework that each of the component drawings is provided with. A solid square representation with a numeral 6a is a source positioning marker serving as a reference point of the source component drawing for properly positioning the source component drawing in a combining process. A solid circle representation with a numeral 6b is a destination positioning marker serving as a reference point of the destination component drawing for properly positioning the destination component drawing in a combining process.

A solid square with a reference numeral 7a attached to a dimension line in the component drawing is a source drawing dimension line positioning marker serving as a reference point for properly positioning a dimension line of the source drawing. A solid circle with a reference numeral 7b is a destination drawing dimension line positioning marker serving as a reference point for properly positioning a dimension line of the destination drawing. Reference numeral 8 indicates a drawing framework in which the drawing components are accommodated and a product specification is entered. The drawing framework 8 is provided with destination positioning markers 6b to which respective component drawings are aligned.

Numeral 9 indicates a component drawing of a controller, 10 indicates a component drawing of an upper lid, 11 indicates a component drawing of a control valve main body, 12 indicates a component drawing of a trim, and 13 indicates a component drawing showing how a pipe is attached.

A description will now be given of the combining process.

The component drawings of FIG. 3 are pasted to the framework to adapt to the scale of the component drawing 9 of the controller, a characterizing feature of the control valve for industrial process control. The component drawing 9 has the destination drawing dimension line positioning marker 7b attached to an end of the dimension line drawn across a plurality of component drawings. The destination positioning marker 6b is also provided in the component drawing 9. The destination positioning marker 6b is provided so that the component drawing 9 and the component drawing 10 of the upper lid are properly positioned relative to each other when the component drawing 10 is pasted such that the source positioning marker 6a provided in the component drawing 10 is aligned with the destination positioning marker 7b. In FIG. 3, the component drawing 10 is temporarily pasted and may be replaced by another component drawing of the upper lid.

Likewise, the component drawing 11 for the control valve main body is pasted such that the source positioning marker 6a thereof is aligned with the destination positioning marker 6b of the component drawing of the upper lid. The source drawing dimension line positioning marker 7a in the component drawing 11 of the control valve main body is aligned with the destination drawing positioning marker 7a provided in the component drawing 9 of the controller. The horizontal and vertical coordinates of the source drawing dimension line positioning marker 7a are converted in association with the destination drawing dimension line positioning marker 7b. As a result of this, the dimension line may be compressed or extended in the horizontal and/or in the vertical direction. Accordingly, the dimension lines are automatically connected to each other. In FIG. 3, the dimension line provided in the component drawing 11 is extended as indicated by a dotted line.

The component drawing 9 of the controller in which the virtual frameworks 5 of the other component drawings are superimposed on each other is pasted to the drawing framework 8 such that the positioning markers are aligned. The destination positioning marker 6b for each of the component drawing is predetermined. Thereafter, the component drawing 13 showing how a pipe is attached and the component drawing 12 of the trim are pasted to the drawing framework 8 so that the respective source positioning markers are aligned with the corresponding destination positioning markers in the drawing framework 8 (step ST5, step ST6). If any of the component drawings is to be replaced by another component drawing, control is returned to step ST4, whereupon the aforementioned steps are repeated until the drawing is complete.

FIG. 4 shows a state in which the component drawings are combined. In the state shown in FIG. 4, combining of the component drawings is not finalized. That is, the positioning markers remain effective. The engine 4 outputs the drawing in this state to the display device of the man-machine interface 1, whereupon an operator confirms the state visually (step ST7, step ST8). If the drawing turns out not to match the desired specification, control is returned to step ST1, whereupon the drawing generation process is repeated. If a confirmation-that the drawing matches the specification is input via the input device of the man-machine interface 1, the engine unit 4 outputs the drawing to the printing device of the man-machine interface 1 (step ST9). With the above-described operation, generation of the drawing is completed. FIG. 5 shows the drawing thus completed.

By storing the positioning markers that define the positions of source drawings and destination drawings in the combining process, the apparatus can combine the component drawings efficiently and accurately. Since the dimension line is automatically redrawn such that the dimension line positioning markers are aligned, there is no need to manually redraw the lines. Accordingly the efficiency of operation is significantly improved.

What is claimed is:

1. A drawing generation apparatus for generating a drawing that matches a specification by selecting component drawings based on one of input specification information and drawing information, and combining the component drawings by pasting a source component drawing to a destination component drawing, comprising:

a component drawing database for storing the component drawings, each component drawing being provided with a positioning marker indicating one of a source reference position of a source component drawing and a destination reference position of a destination component drawing, and with a dimension line having a dimension line positioning marker attached thereto, said dimension line positioning marker indicating one of a source reference position and a destination reference position;

a component information database that allows selection of the component drawings based on one of the input specification information and the drawing information, and outputting component drawing information relating to the component drawings; and an engine unit for retrieving the component drawings from said component drawing database based on the component drawing information from said component information database, combining the component drawings such that the positioning markers are aligned, and then extending or compressing the dimension lines until said dimension line positioning markers are aligned.

2. The drawing apparatus according to claim 1, wherein each of the component drawings is provided with a virtual framework, and combined component drawings are combined together in a drawing framework.

* * * * *